United States Patent
Large et al.

(10) Patent No.: US 8,514,260 B2
(45) Date of Patent: Aug. 20, 2013

(54) ESTABLISHING EYE CONTACT IN VIDEO CONFERENCING

(75) Inventors: Timothy Andrew Large, Bellevue, WA (US); Daniel Rosenfeld, Seattle, WA (US); Neil Emerton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1119 days.

(21) Appl. No.: 12/474,044

(22) Filed: May 28, 2009

(65) Prior Publication Data

US 2010/0302344 A1 Dec. 2, 2010

(51) Int. Cl.
*H04N 7/14* (2006.01)
*G02B 27/10* (2006.01)

(52) U.S. Cl.
USPC .................... 348/14.01; 348/14.08; 348/14.1; 359/627

(58) Field of Classification Search
USPC ................ 379/93.35, 93.09, 215.01, 209.01, 379/210.01, 265.01, 265.02, 265.09, 265.11, 379/266.01, 242, 272, 273; 455/414.1, 417, 455/445; 348/14.01–14.16
See application file for complete search history.

(56) References Cited

U.S. PATENT DOCUMENTS

| | | | | |
|---|---|---|---|---|
| 5,117,285 A * | 5/1992 | Nelson et al. | | 348/14.16 |
| 5,438,357 A * | 8/1995 | McNelley | | 348/14.1 |
| 5,675,376 A | 10/1997 | Andersson et al. | | |
| 5,953,053 A * | 9/1999 | Chen et al. | | 348/14.16 |
| 6,434,257 B1 * | 8/2002 | Mohan et al. | | 382/110 |
| 7,119,829 B2 | 10/2006 | Leonard et al. | | |
| 2006/0251384 A1 | 11/2006 | Vronay et al. | | |
| 2007/0104968 A1 * | 5/2007 | Jin et al. | | 428/447 |
| 2007/0120954 A1 | 5/2007 | Allen et al. | | |
| 2007/0133094 A1 * | 6/2007 | Walton et al. | | 359/599 |
| 2008/0012936 A1 | 1/2008 | White | | |
| 2008/0018672 A1 * | 1/2008 | Lin et al. | | 345/690 |

OTHER PUBLICATIONS

Yip, et al., "An Effective Eye Gaze Correction Operation for Video Conference using Anti-Rotation Formulas", retrieved at <<http://ieeexplore.ieee.org/stamp/stamp.jsp?tp=&arnumber=1292546&isnumber=28789, Dec. 15-18, 2003, Singapore, pp. 699-703.

Barakonyi, et al., "Cascading Hand and Eye Movement for Augmented Reality Videoconferencing", retrieved at <<http://www.icg.tu-graz.ac.at/pub/pdf/barakonyihandeyemovement07, pp. 8.

Vertegaal, et al., "Gaze-2: Conveying Eye Contact in Group Video Conferencing Using Eye-Controlled Camera Direction", retrieved at <<http://www.ivoweevers.nl/Publications/Docs/GAZE-2%20Long.pdf, pp. 8.

Nguyen, David., "MultiView: Spatially Faithful Group Video Conferencing", retrieved at <<http://citeseerx.istpsu.edu/viewdoc/download?doi=10.1.1.117.6900&rep=rep1&type=pdf>>, May 23, 2005, pp. 48.

* cited by examiner

*Primary Examiner* — Wesley Kim
(74) *Attorney, Agent, or Firm* — Alleman Hall McCoy Russell & Tuttle LLP (57) ABSTRACT

A video-conferencing system includes a display panel configured to form a display image for viewing by a local video conferencer, a camera configured to acquire a facial image of the local video conferencer and having an aperture oriented toward the display panel, and an array of partly reflective facets aligned in parallel against a plane disposed parallel to and forward of the display panel, each facet positioned to transmit a portion of the display image from the display panel through that facet to the local video conferencer, and to reflect a portion of the facial image of the local video conferencer to the aperture.

14 Claims, 5 Drawing Sheets

ESTABLISHING EYE CONTACT IN VIDEO CONFERENCING

BACKGROUND

The bandwidth capacity of the global communications infrastructure has increased dramatically in recent years. As a result, video conferencing has become a practical alternative to costly, inconvenient, and energy-intensive business travel. In addition, video conferencing for non-business use is gaining popularity as an alternative to audio-only telephony. However, various technological impediments may limit some participants' satisfaction with the video-conferencing experience. For example, participants may find it difficult to maintain eye contact with each other during a video conference. Absent such eye contact, the participants may be less able to exchange non-verbal communication cues that guide and facilitate polite, face-to-face conversation.

SUMMARY

Therefore, in one embodiment, a video-conferencing system is provided. The video-conferencing system includes a display panel configured to form an image of a remote video conferencer for viewing by a local video conferencer. The video-conferencing system further includes a thin array of partly reflective facets positioned and aligned to reflect an image of the local video conferencer to a camera.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

The subject matter of the present disclosure is now described by way of example and with reference to certain illustrated embodiments. Components that may be substantially the same in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

Figure 1:
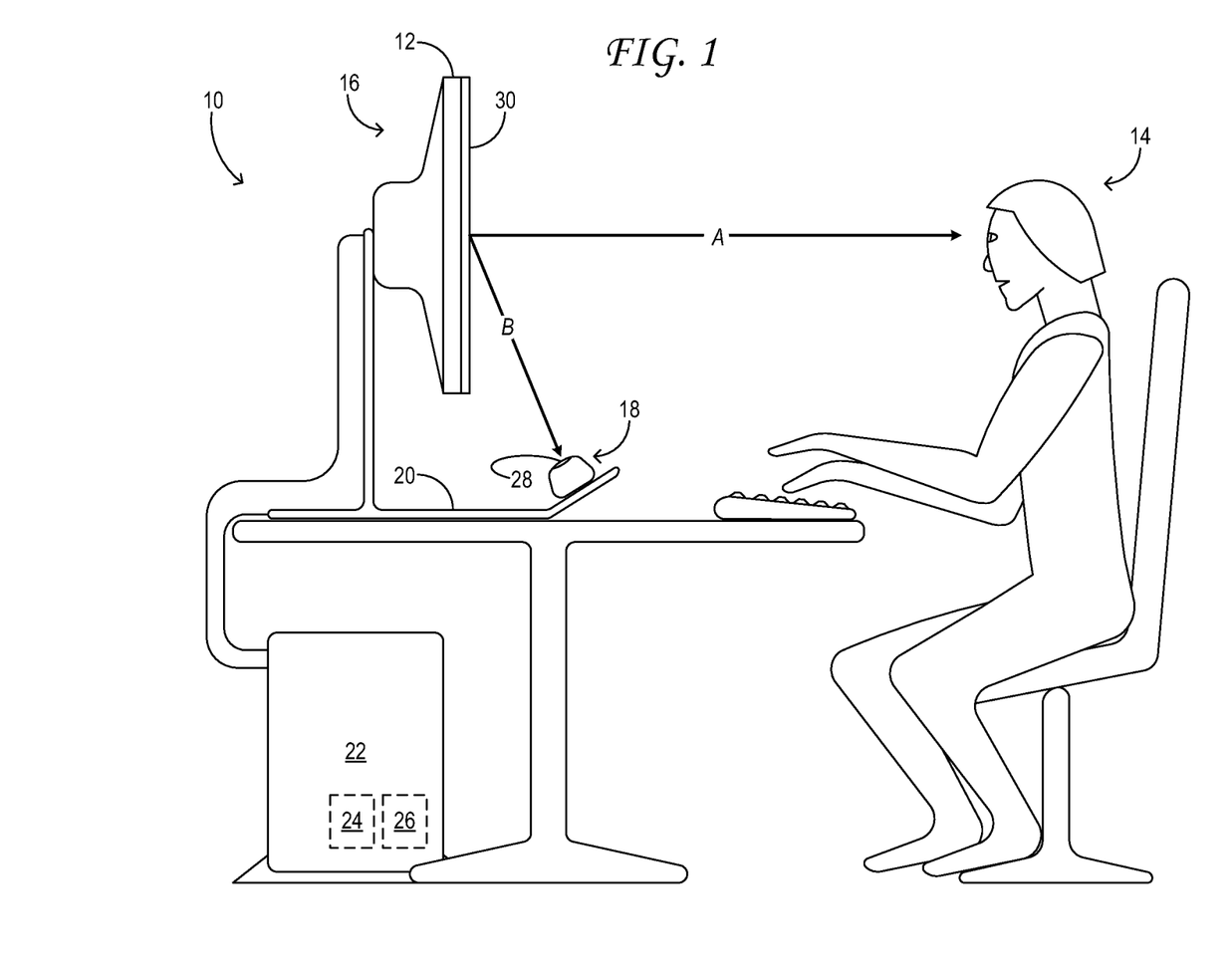
FIG. 1 shows aspects of an example video-conferencing system in accordance with the present disclosure.

FIG. 1 shows aspects of an example video-conferencing system 10. The video-conferencing system includes display panel 12, which is configured to form a display image for viewing by a local video conferencer 14. Accordingly, FIG. 1 shows local video conferencer 14 seated forward of the display panel. The terms 'forward' and 'in front of' as used herein correspond to the direction labeled A in the drawings. It will be understood that the terms 'first direction', 'direction A', 'second direction', 'direction B', and all other terms specifying orientation, may each embrace a principal direction in addition to a relatively small range of angles about the principal geometric direction, as will be evident to one skilled in the art of optical engineering. In the embodiment illustrated in FIG. 1, the display panel is part of computer monitor 16. The video-conferencing system also includes camera 18, configured to acquire a facial image of local video conferencer 14, as further described below. Camera mount 20 is mechanically coupled to the display panel and configured to support the camera forward of the display panel, such that neither the camera nor the camera mount eclipses the local video conferencer's view of the display panel. The camera mount may be coupled to the display panel in any suitable manner; it may be coupled indirectly, via the computer monitor, for example, or any other structure. In some embodiments, both the camera and the camera mount may have a substantially non-reflective finish. The exterior surfaces of the camera and the camera mount may have a light-scattering texture, be painted flat black, or be molded from a flat black material, for example.

In the embodiment illustrated in FIG. 1, display panel 12 and camera 18 are operatively coupled to computer 22. The computer includes memory 24 and at least one processor 26. A processor may be operatively coupled to one or more input/output devices within the computer, and thereby configured to provide an image to display panel 12 and to receive an image from camera 18. Further, the memory may embody a set of instructions to enable the processor to manipulate images received from the camera and/or provided to the display panel. Although FIG. 1 shows the computer located close to the display panel and local video conferencer 14, the computer may be located remotely in other embodiments.

A basic geometric problem common to some video-conferencing configurations can be appreciated with reference to FIG. 1. Assume that local video conferencer 14 is the first of two participants in a remote video conference; his gaze will naturally be directed toward the center of display panel 12, where a remote video conferencer's face is displayed. If camera 18 were located at the center of the display panel and focused on the local video conferencer's face, then the local video conferencer would be looking into the aperture of the camera whenever he looks at the center of the display panel. In viewing the image stream from the camera, the remote video conferencer would perceive that that the local video conferencer is looking directly into her eyes, consistent with polite, face-to-face conversation in many cultures. However, the presence of the camera in front of the remote video conferencer's face may be distracting to the local video conferencer.

To maintain an unobstructed view of the remote video conferencer's face, the local video conferencer may locate camera 18 above, below, or to the side of display panel 12, while keeping the camera focused on his face. In that case, however, the remote video conferencer will no longer perceive that the local video conferencer is looking directly into her eyes. She will perceive, instead, that the local video conferencer is looking to the side, looking above her head, or looking below her face, depending on the particular location of the camera. Likewise, if the remote video conferencer uses a similar video-conferencing configuration, then the local video conferencer will perceive a lack of eye contact on the part of the second. Such perceptions may limit the communication of non-verbal communication cues between the participants, and thereby cause dissatisfaction with the video-conferencing experience.

Therefore, in the embodiment of FIG. 1, aperture 28 of camera 18 is oriented toward display panel 12 and away from local video conferencer 14. In this configuration, the camera is configured to capture a facial image of the local video conferencer reflected off a thin, beam-splitting layer 30 optically coupled to the display panel.

Figure 2:
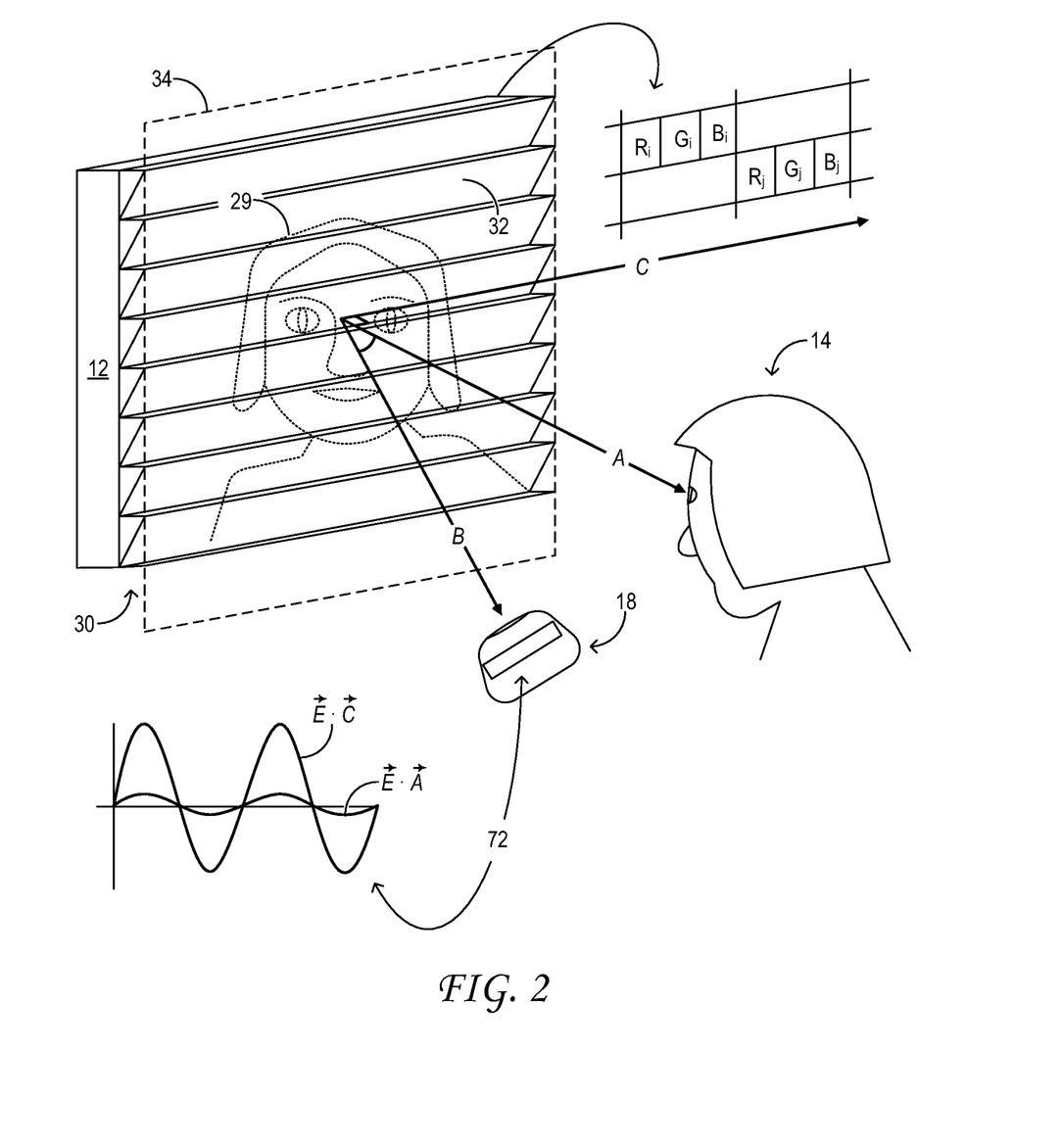
FIG. 2 somewhat schematically shows a display panel and a beam-splitting layer in accordance with an embodiment of the present disclosure.

FIG. 2 shows a view of display panel 12 and beam-splitting layer 30 in an example embodiment. Display panel 12 may be any image-forming panel providing a suitably high-quality display image 29 to facilitate video conferencing. The display panel may be a cathode-ray tube, a liquid-crystal display, an active-matrix plasma display, or a light-emitting diode array, for example.

Beam-splitting layer 30 comprises an array of partly reflective facets 32 aligned in parallel against a plane 34, which is disposed parallel to and forward of display panel 12, normal to direction A. Each facet is positioned to transmit a portion of display image 29 from the display panel through that facet and toward local video conferencer 14. Additionally, each facet is positioned to reflect a portion of a facial image of local video conferencer 14 to camera aperture 28. As such, the array of partly reflective facets is configured to transmit the display image from the display panel to local video conferencer 14 in direction A, normal to the display panel, and to reflect a facial image of local video conferencer 14 in direction B, oblique to direction A. As shown in FIG. 2, each facet is aligned in direction C, orthogonal to directions A and B. Further, in the embodiment shown in FIG. 2, the array of partly reflective facets are oriented in parallel, oblique to directions A and B.

Figure 3A:
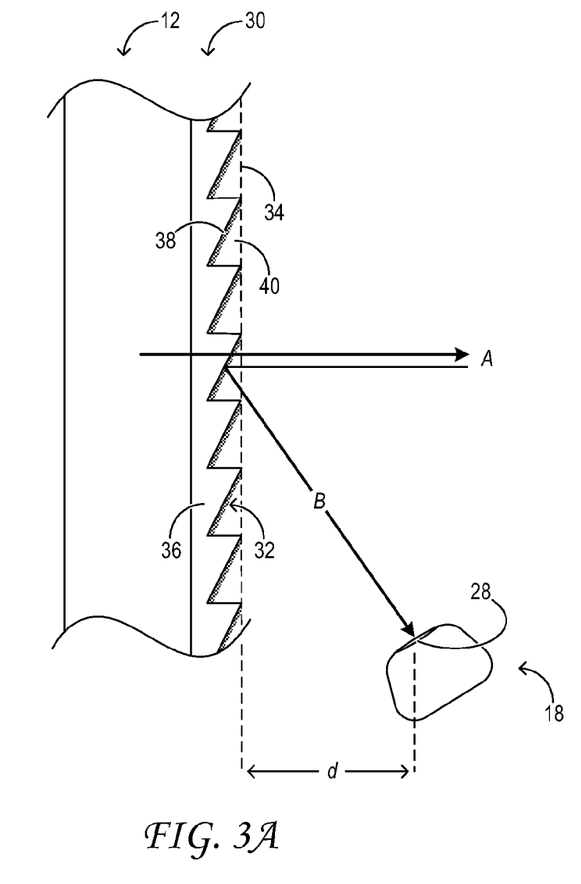
FIGS. 3A, 3B, and 3C somewhat schematically show example beam-splitting layers in accordance with embodiments of the present disclosure.

FIG. 3A shows a cross sectional view of beam-splitting layer 30, showing the array of partly reflective facets 32 in one, example embodiment. The array of partly reflective facets may include 5 to 10 facets per linear centimeter of the array, and may be configured to cover most or all of the viewable area of display panel 12. Each facet of the array may extend 400 to 800 microns rearward from plane 34 at an angle of 22.5 degrees. It will be understood that the materials and dimensions recited herein are provided by way of example and in no way limit the scope of the present disclosure.

In the embodiment illustrated in FIG. 3A, the array of partly reflective facets 32 is formed in structured polymer film 36, which has a regular prismatic, faceted structure. The structured polymer film may be a manufactured film, or it may be formed from a manufactured film by suitable surface modification. In other embodiments, the array of partly reflective facets may be formed in any suitable optic coupled to display panel 12—a diffuser, for instance—by milling or etching or in any other suitable manner.

As shown in FIG. 3A, the array of partly reflective facets 32 further comprises a reflection-enhancing material 38 disposed on an outward-facing surface of the facets. The reflection-enhancing material may comprise an incomplete or patchy coating of aluminum, silver, or some other metal. It may be deposited on the array of facets by subjecting structured polymer film 36 to electron-beam sputtering or metal evaporation, for example. In some embodiments, application of the reflection-enhancing coating may increase the reflectance of the array of partly reflective facets to between 10 and 50 percent at normal incidence. In this manner, a bright and highly contrasted facial image of local video conferencer 14 may be provided to camera 18, while still allowing the local video conferencer to view display image 29. It will be understood that the specific ranges enumerated herein are provided as examples only, as other suitable ranges are contemplated as well.

In the embodiment shown in FIG. 3A, structured polymer film 36 supports reflection-enhancing material 38, and further supports overmolding layer 40. The overmolding layer may be index-matched to the structured polymer film. The term 'index-matched' is used herein to describe materials whose refractive indices are approximately equal (e.g., differ by less than five percent). By virtue of the overmolding layer, the outer surface of beam-splitting layer 30 may be smooth and featureless, thereby reducing the risk of abrasive damage to the facets and enabling easier cleaning of the surface. In embodiments where the array of partly reflective facets supports an overmolding layer, the orientation of each facets, i.e., the angle that each facet makes with the plane to which the array is aligned, may be adjusted to compensate for refraction at the air/overmolding layer interface.

A further advantage of overmolding layer 40 is that it may reduce Moiré effects in display image 29 caused by the interaction of the array of partly reflective facets 32 and a rectangularly pixelated display panel, such as display panel 12. Moiré effects may further be reduced by properly orienting the array of partly reflective facets relative to the direction of alignment of the chromatically complementary elements of the display panel pixels. As shown in FIG. 2, for example, the three chromatically complementary elements (R, G, B) of each pixel are aligned in parallel to the direction of alignment of the array of partly reflective facets. This corresponds to direction C in FIG. 2. A further strategy for the reduction of Moiré effects is by adjustment of the draft angle of the array of partly reflective facets.

It will be appreciated that some embodiments fully consistent with the present disclosure may lack an overmolding layer. Further, as structured polymer film 36 may, in native form, be at least partially reflective, some embodiments may lack a reflection-enhancing material.

In some embodiments, light from display image 29 may be excluded from camera aperture 28. Such embodiments are illustrated in FIGS. 4-7.

Figure 4:
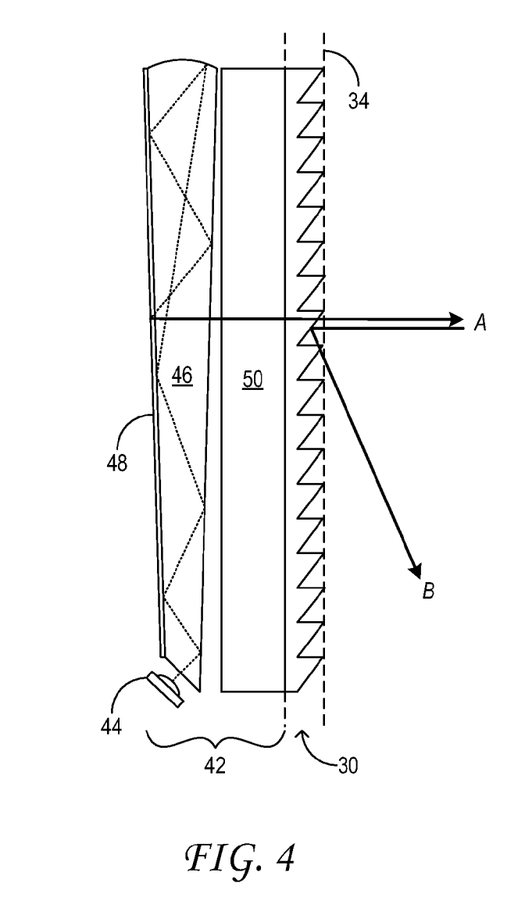
FIG. 4 somewhat schematically shows a display panel and a beam-splitting layer in accordance with another an embodiment of the present disclosure.

FIG. 4 shows a cross section of display panel 42 and beam-splitting layer 30 in another example embodiment. The display panel includes a collimated light source having an array of light emitting diodes 44 and a wedge-shaped light guide 46. The wedge-shaped light guide has opposing first and second faces, a thicker, light-reflecting end adjacent the first and second faces, and a thinner, light-admitting end opposite the thicker, light-reflecting end. The array of light-emitting diodes are positioned at, and oriented to project light into, the thinner end of the wedge-shaped light guide. Opposite the thinner end is a thicker end, which supports a reflective coating. The back face of the wedge-shaped light guide supports a microstructured turning film 48, and the opposite, front face illuminates liquid-crystal light valve 50.

In the embodiment shown in FIG. 4, the array of light-emitting diodes 44 projects light into wedge-shaped light guide 46. The light propagates through the wedge-shaped light guide via total internal reflection at the boundaries of the opposing faces. When a light ray is incident on the boundary of the back face at less than the Snell's Law critical angle for total internal reflection, the light ray is refracted through to microstructured turning film 48, and bounces out of the light guide substantially normal to the opposing faces. The wedge-shaped light guide is thereby configured to turn and collimate light from the array of light-emitting diodes and to direct the light in the direction labeled A in the drawings. In this manner, the light-emitting diode array and wedge-shaped light guide provide substantially collimated light to liquid-crystal light valve 50. In other embodiments fully consistent with this disclosure, other small-format light sources may be used in place of the light-emitting diode array described herein-compact halogen or fluorescent lamps, for example.

Figure 5:
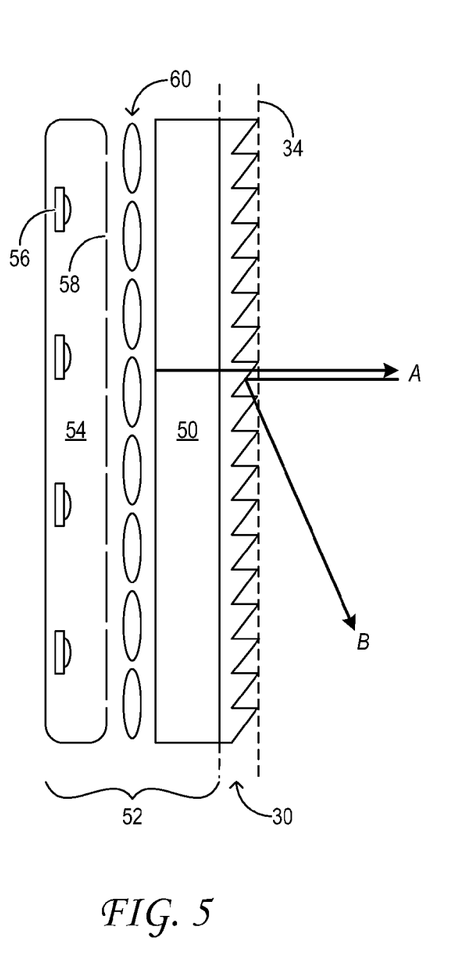
FIG. 5 somewhat schematically shows a display panel and beam-splitting layer in accordance with another an embodiment of the present disclosure.

FIG. 5 shows a cross section of display panel 52 and beam-splitting layer 30 in another example embodiment. The display panel includes a collimated light source having an internally reflective and light-scattering envelope 54 enclosing an array of light-emitting diodes 56. Formed in an emissive face of the envelope are an array of apertures 58. The array of apertures may be regularly spaced and may cover most of the area of the emissive face of the envelope. In one embodiment, the array of apertures may comprise pin holes spaced apart in orthogonal directions on the emissive face. In another embodiment, the array of apertures may comprise regularly spaced, narrow slits. Further, the spacing of the apertures may be based on the pixel-width in the display image provided by liquid-crystal light valve 50. There may be 2 to 3 apertures per pixel width, for example. It will be understood that different configurations and sizes of apertures and different aperture spacings are contemplated equally contemplated.

Display panel 52 also includes an array of lenticular elements 60 disposed in registry with the array of apertures 58. In some embodiments, each lenticular element in the array of lenticular elements has substantially the same focal length f, and is offset forward of its corresponding aperture by a distance f.

In the embodiment illustrated in FIG. 5, the array of lenticular elements 60 are configured to collimate the light escaping through the array of apertures 58. Most of the light flux from the array of light-emitting diodes 56 will eventually escape through the array of apertures and be collimated because the reflective interior of the envelope is direction-randomizing and very weakly absorbing. In this manner, the array of light-emitting diodes 56, light scattering envelope 54, and the array of lenticular elements 60 provide substantially collimated light to liquid-crystal light valve 50.

In the embodiments shown in FIGS. 4 and 5, liquid-crystal light valve 50 is configured to form display image 29 by attenuating at least some light from the collimated light source. The display image so formed exits the light guide still collimated and is incident on beam-splitting layer 30 in a first direction A, as shown in the drawings.

Figure 6:
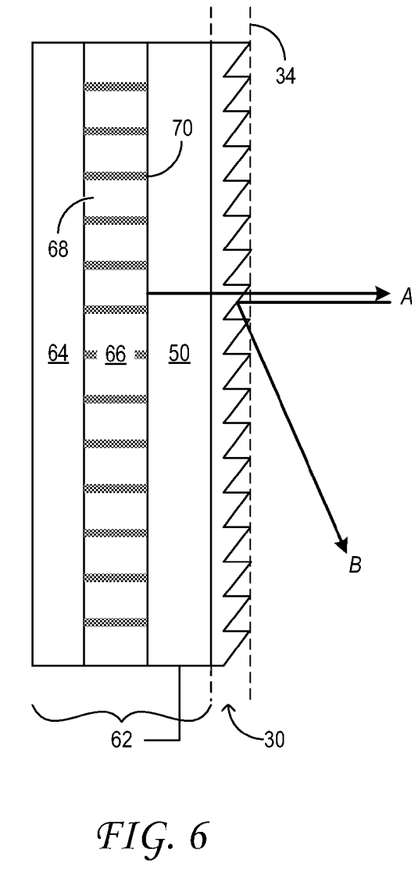
FIG. 6 somewhat schematically shows a display panel and a beam-splitting layer in accordance with another embodiment of the present disclosure.

FIG. 6 shows a cross section of display panel 62 and beam-splitting layer 30 in another example embodiment. The display panel includes a light source having a fluorescent backlight assembly 64 and a direction-selective filter 66. The fluorescent backlight assembly may include one or more compact fluorescent lamps enclosed in an internally reflective and light-scattering envelope such as described above. The fluorescent backlight assembly may further include one or more diffusing structures; consequently, the light emitted from the fluorescent backlight assembly may be substantially lambertian.

Direction-selective filter 66 is therefore configured to limit the range of angles over which light from fluorescent backlight assembly 64 is incident on liquid-crystal light valve 50. In particular, the direction-selective filter may be configured to transmit light directed toward the local video conferencer and normal to display panel 62 (direction A in the drawings), and to block light directed toward the camera aperture 28 (direction B in the drawings).

In the embodiment illustrated in FIG. 6, direction-selective filter 66 comprises a plurality of light-transmitting zones 68 bounded by a plurality of substantially parallel light-blocking layers 70. The light-transmitting zones may comprise an optically transparent polymer material. In the various embodiments contemplated herein, the light-blocking layers may be absorbing, reflecting, and/or scattering layers. In one embodiment, the light-blocking layers may each comprise a thin carbon-black film disposed between adjacent light-transmitting zones. In some embodiments, the direction-selective filter may comprise a prefabricated, flexible film—a privacy film manufactured by 3M Corporation of Saint Paul, Minn., for example.

As described hereinabove, direction-selective filter 66 may admit to liquid-crystal light valve 50 light that is not collimated, but spans a broad range of directions relative to direction A. However, the projection of such range of directions in the unique plane parallel to directions A and B (the plane of the drawing page) may be limited to a predetermined range of angles from direction A. In one embodiment, the predetermined range of angles may span ±5° or ±10°. In another embodiment, the predetermined range of angles may be any range sufficient to prevent a substantial amount of light from the display image from reaching aperture 28 of camera 12. In this manner, the fluorescent backlight assembly 64 and direction-selective filter 66 provide direction-filtered light to liquid-crystal light valve 50.

In the embodiment shown in FIG. 6, the liquid-crystal light valve is optically coupled to filter 66 and configured to form display image 29 by attenuating at least some light from the direction-filtered light source. The display image so formed exits the light guide still direction-filtered and is incident on beam-splitting layer 30 in the range of directions described above.

The above embodiments show that light from display image 29 can be excluded from a camera aperture in video-conferencing system via the detailed configuration of the display panel and the beam-splitting layer. In other embodiments, the configuration and/or operation of the camera may be modified in order to exclude such light from the camera aperture. In the embodiment illustrated in FIG. 2, for example, the camera comprises a polarizing filter 72 having a polarization plane parallel to the direction of alignment of each facet of the array of partly reflective facets (direction B in FIG. 2) and parallel to the optical axis of the camera (direction B). In other embodiments, the display panel may be configured to repeatedly suspend forming the display image, and the camera may be configured to acquire the facial image when the forming of the display image is suspended.

Figure 3B:
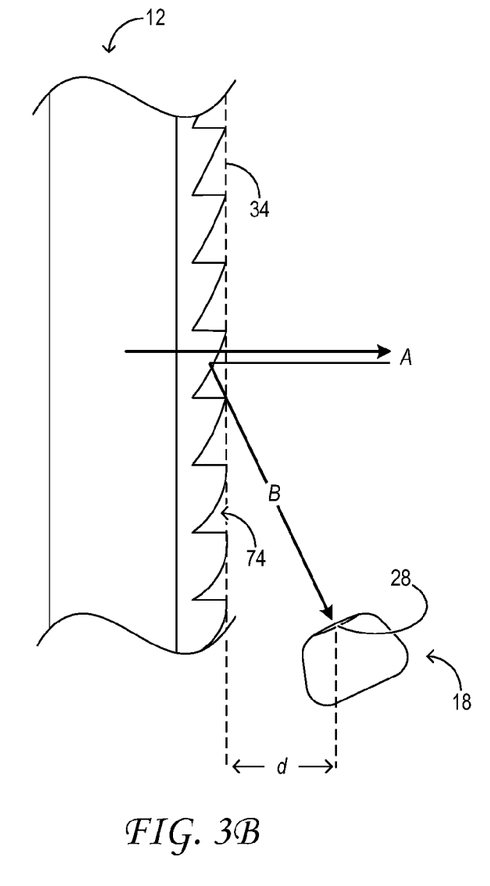

The arrays of partly reflective facets described herein will be recognized as Fresnel-type reflectors. In general, a Fresnel-type reflector may or may not be configured to have optical power, i.e., a finite focal length, to provide such functions as focusing, defocusing, and collimating. Accordingly, in some of the embodiments described herein, the facial image of the local video conferencer is focused on the camera aperture via the camera lens and no other focusing optic. In these embodiments, the array of partly reflective facets may constitute a Fresnel-type reflector having infinite focal length. However, other embodiments are contemplated where a Fresnel-type reflector of finite focal length may be useful for enabling the camera to be positioned closer to the display panel, thereby reducing the overall footprint of the video-conferencing system. For example, it will be appreciated, with reference to FIG. 3A, that as camera 18 is moved closer to display panel 12 with the aperture of the camera facing the center of the display panel, the field of view of the camera, if wide enough to capture the entire display panel, will also capture an increasing area below the display panel. By focusing the facial image of the local video conferencer onto the camera lens, where it is further focused onto the camera aperture, a more efficient use of the camera's field of view is possible. Therefore, to impart a finite focal length to the array of partly reflective facets and allow such focusing, the array of partly reflective facets may, in some embodiments, comprise a series of curved facets in which a radius of curvature increases within the series. One such array 74 is shown by example in FIG. 3B, in which the distance d between camera aperture 28 and the plane against which the array of facets is aligned is smaller than the corresponding distance in FIG. 3A.

Figure 3C:
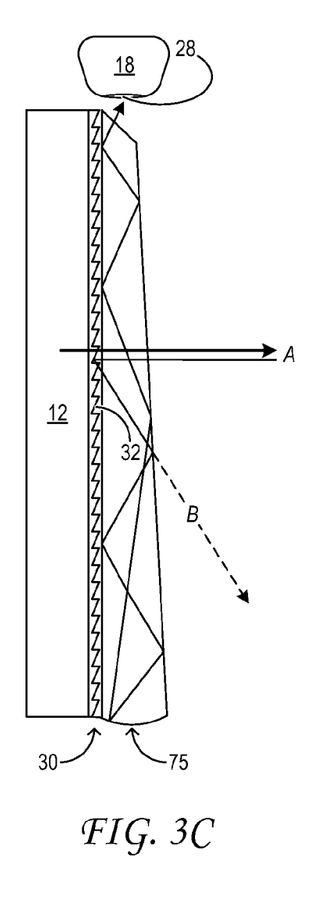

Still other embodiments enable the camera to be positioned even closer to the display panel. For example, FIG. 3C shows wedge-shaped optic 75 disposed in front of beam-splitting layer 30 and display panel 12. Wedge-shaped optic 75 may be roughly similar in configuration to wedge-shaped optic 46; it has opposing first and second faces, a thicker, image-reflecting end adjacent the first and second faces, and a thinner, image-releasing end opposite the thicker, image-reflecting end. In this embodiment, however, wedge-shaped optic 75 does not include a turning film. Instead, the light-turning function is provided by the array of partly reflective facets 32 to which the wedge-shaped optic is bonded.

In the embodiment illustrated in FIG. 3C, the first face of wedge-shaped light guide 75 is substantially parallel to display panel 12 and beam-splitting layer 30. Further, the wedge-shaped optic is separated from the array of partly reflective facets 32 by an air gap of fixed thickness. Structurally, the thickness of the air gap may be maintained by one or more spacers (not shown in the drawings) disposed between beam-splitting layer 30 and wedge-shaped optic 75, in a peripheral region of the display area. Bounded on both opposing faces by air, the wedge-shaped optic may be configured to transmit light via total internal reflection (TIR) at the optic/air interface, as further described below. In another embodiment, the wedge-shaped optic may be bonded to the array of partly reflective facets via an adhesive or cladding layer having a lower refractive index than the material from which the wedge-shaped light guide is formed. In these configurations, the wedge-shaped optic may transmit light via TIR at the optic/adhesive or optic/cladding interface of one face, and at the optic/air interface of the opposing face. In still other embodiments, both of the opposing faces of the wedge-shaped light guide may support a lower refractive-index cladding layer enabling TIR.

In the embodiment illustrated in FIG. 3C, light from the display image is transmitted through the array of partly reflective facets 32 in the direction labeled A, as in the foregoing embodiments. Incident on the opposing faces of wedge-shaped optic 75 at less than the critical angle for TIR, this light is transmitted directly through the wedge-shaped optic and may be viewed by the local video-conferencer. Similarly, light from the facial image of the local video-conferencer passes directly through the wedge-shaped optic and reaches the array of partly reflective facets 32. As in the foregoing embodiments, light from the facial image of the local video-conferencer is reflected from the array of partly reflective facets in direction B, oblique to direction A. This light enters the wedge-shaped light guide at an angle greater than the critical angle for TIR at the optic/air boundary and therefore propagates down the optic via TIR. After reflection at the reflective thick end of the wedge-shaped light guide, light from the facial image of the local video-conferencer propagates back through to the thinner end, where it exits the wedge-shaped optic and enters aperture 28 of camera 12. In this manner, the wedge-shaped light guide is configured to redirect the facial image of the local video-conferencer to the camera.

In describing the advantages of the foregoing embodiments, it was assumed that both participants in a video conference would situate themselves at the center of the fields of view of their respective cameras, such that each participant's eyes appear at the center of the display image provided to the other participant, as in FIG. 2.

Figure 7:
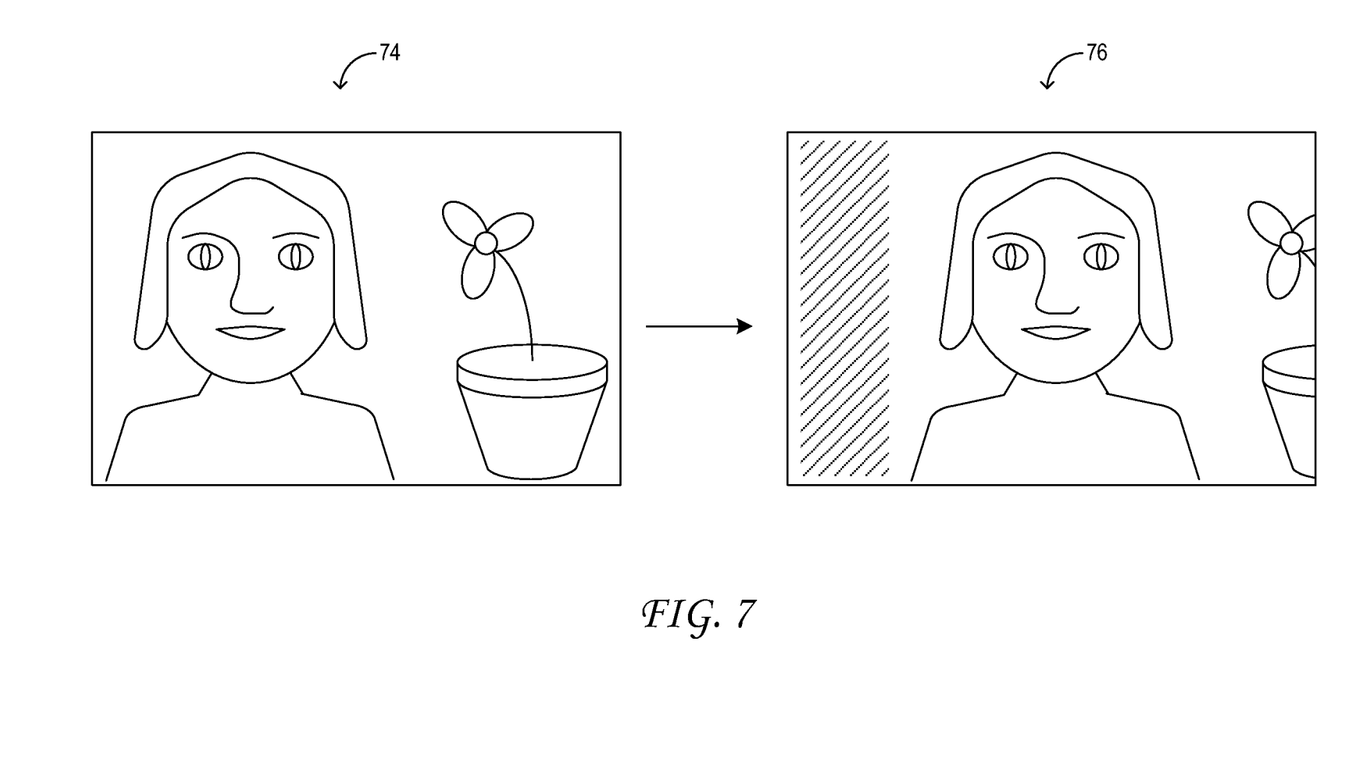
FIG. 7 schematically shows a shift of a video conferencing image in accordance with an embodiment of the present disclosure.

FIG. 7 illustrates another scenario, however, in which the remote video conferencer's face does not appear at the center of the image provided to the local video conferencer. The drawing shows an example correctable display image 74 in accordance with this scenario, in which the remote video conferencer's face is on the left side. In this scenario, the local video conferencer would naturally not look to the center of his display panel, but would instead look to the left side of the display towards the remote video conferencer's eyes, which may cause the remote video conferencer to perceive that he is looking away from her. Therefore, a final embodiment provides an image-shifting solution that centers the remote video conferencer's face on the local video conferencer's display panel, even if the remote video conferencer is not situated at the center of her camera's field of view.

Returning now to FIG. 1, memory 24 of computer 22 may embody instructions that, when executed by processor 26, cause the processor to receive a correctable display image from a remote camera, the correctable display image including eyes of a remote video conferencer, and to translate the correctable display image to yield a corrected display image. Accordingly, an example corrected display image 76 is shown in FIG. 7. In the corrected display image, the geometric midpoint between the eyes of the remote video conferencer is centered horizontally. Further execution of the instructions contained in the memory cause the corrected display image to be displayed on the local video conferencer's display panel.

In one embodiment, correctable display image 74 may be translated by executing an artificial-intelligence based algorithm that locates one or more features in the correctable display image—a nose or eye, for example. The algorithm may then estimate where in the correctable display image the one or more features would be if the geometric midpoint between the eyes of the remote video conferencer were centered horizontally. The algorithm may then calculate a constant, vector offset corresponding to the difference between the location of one or more features in the correctable display image and the estimated location of the one or more features in the correctable display image if the geometric midpoint between the eyes of the remote video conferencer were centered horizontally. The algorithm may then apply a coordinate transform to the correctable display image, displacing each pixel in the correctable display image by the constant vector offset so calculated. In this manner, corrected display image 76 may be generated.

The algorithm outlined above may further comprise filling in the resulting blank areas of corrected display image 76 in any suitable manner and/or cropping the corrected display image so that it will fit on the local video conferencer's display panel. In some embodiments, the algorithm may further include magnifying the corrected display image to substantially fill the local video conferencer's display panel, as shown in FIG. 7. In still other embodiments, an analogous image-shifting solution may be applied so that the geometric midpoint between the eyes of the remote participant are centered vertically as well as horizontally in the corrected display image.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A video-conferencing system comprising:
a display panel configured to form a display image for viewing by a local video conferencer;
a camera configured to acquire a facial image of the local video conferencer;
an array of partly reflective facets disposed parallel to and forward of the display panel;
a wedge-shaped light guide disposed parallel to and forward of the display panel and the array of partly reflective facets, the wedge-shaped light guide having opposing first and second faces, a thicker, image-reflecting end adjacent the first and second faces, and a thinner, image-releasing end opposite the thicker, image-reflecting end, where the first face of the wedge-shaped light guide is substantially parallel to the display panel, and where the wedge-shaped light guide is configured to redirect the facial image of the local video conferencer to the camera, where the camera is disposed at the thinner, image-releasing end of the wedge-shaped light guide,
each facet of the array positioned to transmit a portion of the display image from the display panel through that facet and the wedge-shaped light guide to the local video conferencer, and to reflect a portion of the facial image of the local video conferencer to an aperture via the wedge-shaped light guide.

2. The video-conferencing system of claim 1, where the camera comprises a polarizing filter having a polarization plane parallel to each facet of the array of partly reflective facets.

3. The video-conferencing system of claim 1, further comprising a camera mount mechanically coupled to the display panel and configured to support the camera forward of the display panel such that neither the camera nor camera mount eclipses the local video conferencer's view of the display panel.

4. The video-conferencing system of claim 1, where the display panel comprises a light source and a filter configured to transmit light from the light source in a direction normal to the display panel and to block light from the light source in a direction toward the aperture of the camera.

5. The video-conferencing system of claim 4, where the display panel further comprises a light valve optically coupled to the filter, and where the display panel is configured to form the display image by attenuating light from the light source.

6. The video-conferencing system of claim 1, where the display image is a corrected display image, the video-conferencing system further comprising:
a processor operatively coupled to the display panel; and
memory operatively coupled to the processor;
where the memory embodies instructions that, when executed by the processor, cause the processor to:
receive a correctable display image from a remote camera, the correctable display image including eyes of a remote video conferencer; and
translate the correctable display image to yield the corrected display image, where a midpoint between the eyes of the remote video conferencer are centered horizontally in the corrected display image.

7. A monitor for video conferencing, the monitor comprising:
a display panel configured to form a display image;
an array of partly reflective facets configured to transmit the display image from the display panel to a local video conferencer in a first direction normal to the display panel, and to reflect a facial image of the local video conferencer in a second direction oblique to the first direction, each facet aligned in a third direction orthogonal to the first and second directions, and aligned against a plane disposed forward of the display panel and normal to the first direction; and
a wedge-shaped light guide disposed parallel to and forward of the display panel and the array of partly reflective facets, the wedge-shaped light guide having opposing first and second faces, a thicker, image-reflecting end adjacent the first and second faces, and a thinner, image-releasing end opposite the thicker, image-reflecting end, where the first face of the wedge-shaped light guide is substantially parallel to the display panel, and where the wedge-shaped light guide is configured to redirect the facial image of the local video conferencer to a camera disposed at the thinner, image-releasing end of the wedge-shaped light guide.

8. The monitor of claim 7, where the array of partly reflective facets is disposed in a thin layer optically coupled to the display panel.

9. The monitor of claim 7, where the array of partly reflective facets are oriented in parallel, oblique to the first and second directions.

10. The monitor of claim 7, where the display panel comprises a light source and a filter configured to transmit light from the light source incident on the filter in the first direction and to block light from the light source incident on the filter in the second direction.

11. The monitor of claim 10, where the display panel further comprises a light valve optically coupled to the filter, where the display panel is configured to form the display image by attenuating light from the light source, where the display panel comprises three chromatically complementary elements for each pixel of the display image, and where the three chromatically complementary elements are aligned in the third direction.

12. The monitor of claim 7, further comprising a reflection-enhancing material disposed on the array of partly reflective facets, such that the reflectance of the array of partly reflective facets is between 10 and 50 percent at normal incidence.

13. The monitor of claim 12, where the array of partly reflective facets are formed in a structured polymer film supporting the reflection-enhancing material and further supporting an overmolding layer index-matched to the structured polymer film.

14. A video-conferencing system comprising:
- a display panel configured to form a display image for view by a local video conferencer, the display panel comprising a light valve configured to form the display image by attenuating light from a light source, and a filter optically coupled to the light valve and configured to transmit light from the light source incident on the filter in a first direction, normal to the display panel, and to block light from the light source incident on the filter in a second direction oblique to the first direction;
- an array of partly reflective facets configured to transmit the display image from the display panel to a local video conferencer in the first direction, and to reflect a facial image of the local video conferencer in the second direction, each facet aligned in a third direction orthogonal to the first and second directions, and aligned against a plane disposed forward of the display panel and normal to the first direction;
- a wedge-shaped light guide having opposing first and second faces, a thicker, image-reflecting end adjacent the first and second faces, and a thinner, image-releasing end opposite the thicker, image-reflecting end, where the first face of the wedge-shaped light guide is substantially parallel to the display panel, and where the wedge-shaped light guide is configured to redirect the facial image of the local video conferencer to the thinner, image-releasing end; and
- a camera having an aperture oriented toward the thinner, image releasing end of the wedge-shaped light guide and configured to acquire the facial image of the local video conferencer as reflected by the array of partly reflective facets and redirected by the wedge-shaped light guide.

* * * * *